Dec. 30, 1952 — D. HANSEN — 2,623,406
SPEED REDUCER CASING
Filed Oct. 20, 1950 — 6 Sheets-Sheet 1

INVENTOR:
David Hansen
PER Ernest D. Mermorah,
His Agent

Dec. 30, 1952 D. HANSEN 2,623,406
SPEED REDUCER CASING
Filed Oct. 20, 1950 6 Sheets-Sheet 2

INVENTOR:
David Hansen,
PER Ernes D. Marmorek,
His Agent.

Dec. 30, 1952          D. HANSEN          2,623,406

SPEED REDUCER CASING

Filed Oct. 20, 1950          6 Sheets—Sheet 4

INVENTOR:
David Hansen,
PER *[signature]*,
His Agent.

Dec. 30, 1952  D. HANSEN  2,623,406
SPEED REDUCER CASING

Filed Oct. 20, 1950  6 Sheets-Sheet 6

Patented Dec. 30, 1952

2,623,406

UNITED STATES PATENT OFFICE 2,623,406

SPEED REDUCER CASING

David Hansen, Mortsel, Belgium

Application October 20, 1950, Serial No. 191,142
In Belgium October 31, 1949

7 Claims. (Cl. 74—606)

The invention refers to the industry of the speed-reducer and more especially to the gear speed-reducer.

No reducing apparatus exists of a universal type, i. e. appropriate to all applications. In practice, each case of reduction requires a special reducer, which is certainly one of the greatest difficulties in the economy of this industry. The most usual reducers have evidently been grouped in current types. Attempts have also been made in one same factory to standardize the accessory parts, such as lids, caps, oil-gauges, screws, etc.

But the problem is much more extensive and complex, for the reducer admits, in fact, a certain number of variations and, as each of them can get numerous solutions, we are in presence of an imposing number of different combinations, each of them constituting a type of reducer.

In practice this leads to the necessity of creating a very great number of different models, without current sale, which consequently involves very heavy immobilisations.

The object of the present invention is: improvements in the manufacture of the speed-reducers and its principal aim is, besides all consideration of facility of production and exploitation, to be able to secure, in advance, a relatively very reduced series of models according to entirely new norms and by means of which reduced series it is possible to construct a very great number of types of reducers, practically all those that are normally demanded by the clients. Evidently there is no question here of a mere working plan, but of a mechanical complex in which, owing to an original conception of the case and accessory elements, we obtain that each reducer of a determinate series is, in its characteristics, intimately connected with the reducers that are directly inferior and directly superior in the series under consideration.

According to the invention, all the elements of the reducers of one series are conditioned by the characteristics of the casing.

These characteristics, which are also those of the reducer of the invention, are as follows:

(a) The covering is constituted by three principal parts: the casing properly so called, a removable side-plate and a lateral lid;

(b) The removable side-plate and the large opposite face of the case present a series of identical bores, arranged in opposite pairs and the number of pairs of bores is equal to the greatest number of sets of gears that can be incorporated in the cover plus one;

(c) The distances separating the axes of the next bores are different;

(d) The casing properly so called presents at least three machines surfaces, allowing, on the one hand, mountings of the reducer with a horizontal and a vertical out-put shaft and, on the other hand, a fixation at the top, the bottom and the side;

(e) The adjacent exterior surfaces of the bores of the removable side-plate are machined in the same plane, which eventually permits to close the said bores with one single lid, being appropriate to serve as support of an accessory apparatus, such as a flanged motor, a reducer, a gear-casing, a variable speed drive and any other apparatus;

(f) One face of the casing properly so called parallel to the axis of the bores sub (b) presents one or more openings that may be closed by one or more extended lids, comprising the bearings of the primary shafts.

These essential prescriptions regulate the eminently economical industrial manufacture of speed-reducers, covering all usual applications.

All these characteristics are specified hereafter with reference to the annexed drawings, in which:

The Figures 1 and 2 are very diagrammatic perspective views of the standard-casing characterizing the reducer of the invention;

The Figures 3 to 7 represent the characteristic faces of the casing of which is given a front view, a side view, a back view, a bottom view and a plan view;

The Figures 8 and 9 represent respectively a plan view and a sectional view, according to a line IX—IX, of the removable side-plate of the casing;

The Figures 10 to 17 represent diagrammatically a series of eight casings of progressive sizes and more particularly the relative disposition of the centers of the bores, respectively in each casing;

The Figures 18 and 19, represent respectively in elevation and longitudinal section, a lateral lid with extended bearing;

The Figures 20 to 61 represent diagrammatically and very summarily constructive variations of reducers derived from the same casing of a series under consideration.

The speed-reducer, object of the invention, comprises, like the known reducers: the cover, the gears and the lubrication device.

Pursuant to the invention, the cover is constituted by a very special casing, a removable side-plate, a lateral lid with or without extended bearings and small individual lids.

The casing shows peculiarities which have been specified before sub (a), (b), (d), (e) and (f) illustrated by the Figures 1 to 7. In this example of embodiment, the casing 1 presents an approximately prismatic shape, which is very characteristic with speed-reducers. Three surfaces 2—3—4 are machined, thus facilitating the correct fixation of the reducer in three different planes.

Figures 1, 2:
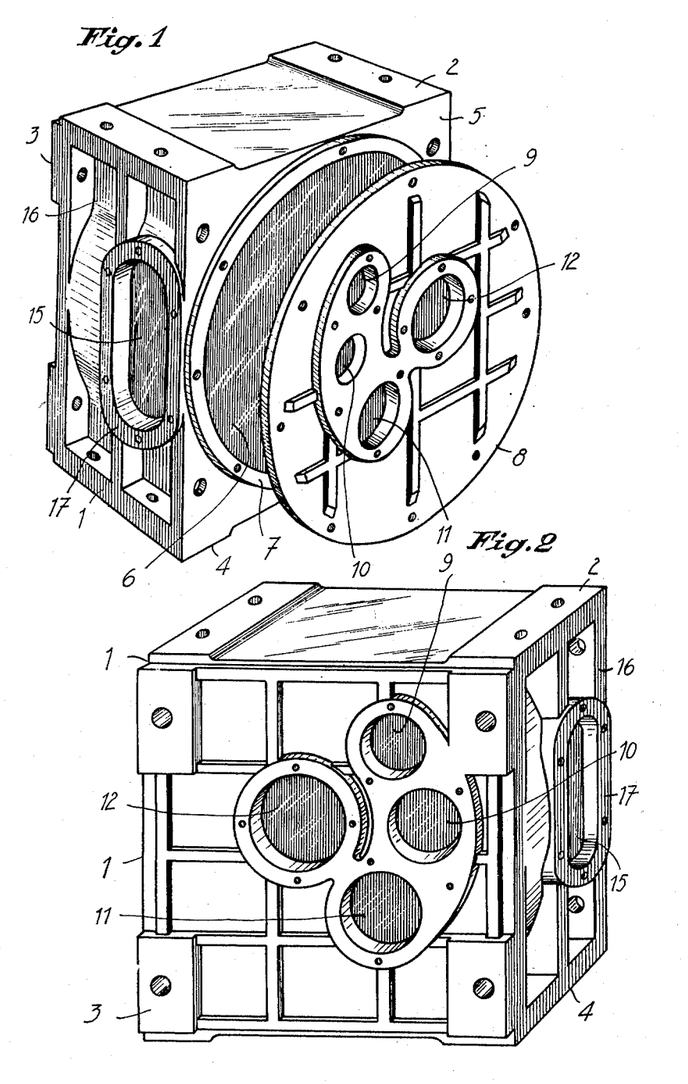
Figure 3:
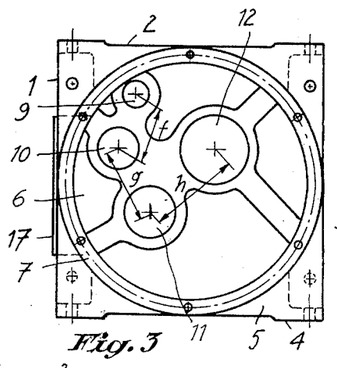
Figure 4:
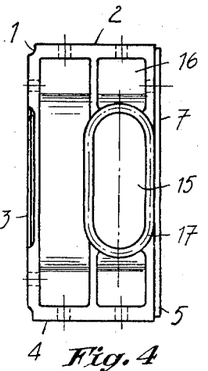
Figures 5, 6, 8, 9:
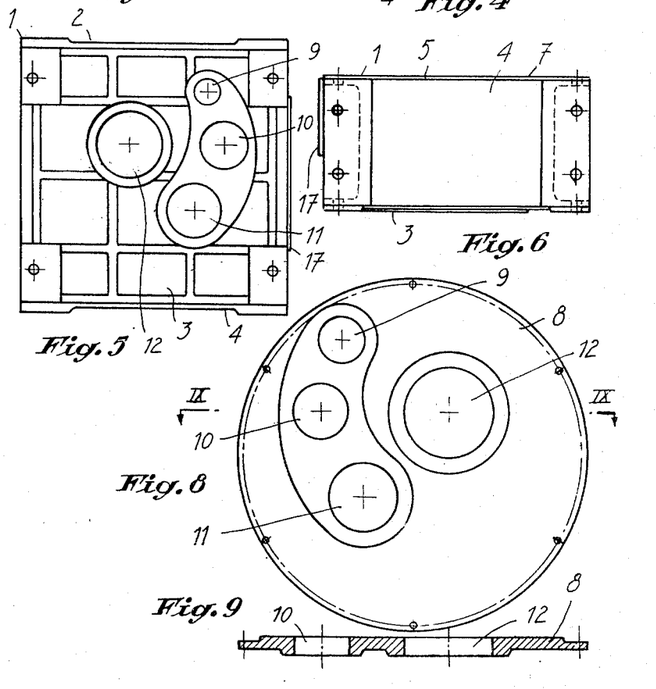
Figures 7, 10:
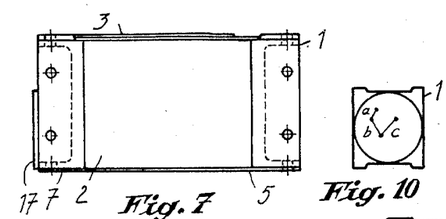
Figure 11:
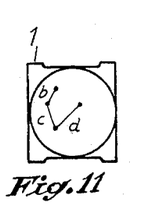
Figure 12:
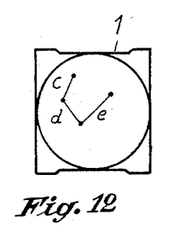
Figure 13:
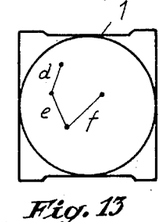
Figure 14:
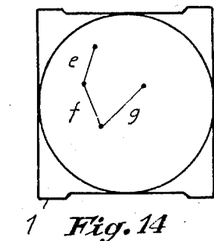
Figure 15:
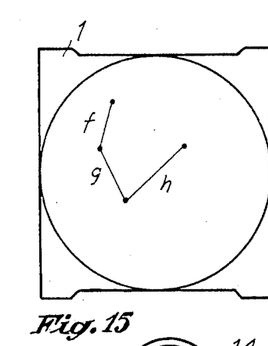
Figure 16:
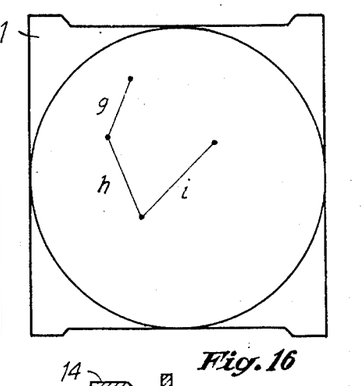
Figure 17:
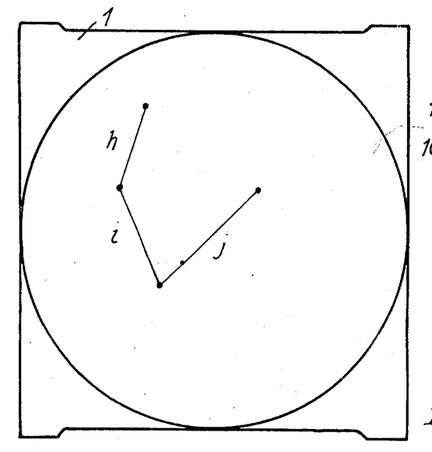

One of the surfaces 5, opposite to the rectified surface 3, presents a large circular opening 6 bordered with a perfectly machined crown 7 on which the removable side-plate 8 represented in the Figures 8 and 9, is firmly fixed.

Figures 18, 19:
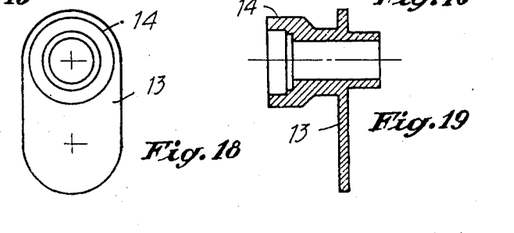

The lateral face 16 of the casing, adjacent to three machined surfaces, presents an oblong opening 15 bordered by a machined edge 17, on which is fixed a lateral lid 13, which may present a bearing 14 extended into the inside or the outside of the casing (Figures 18 and 19).

The machined surface 3 and the removable side-plate 8 present both one same series of four bores opposed by pairs 9—10—11—12.

In the casing of the example of the Figures 3 to 7, the center distances of the successive bores are $f$—$g$—$h$.

Well, if we consider—as represented in the Figures 10 to 17 — a series of casings of eight progressive sizes with center distances $a$—$b$—$c$—$d$—$e$—$f$—$g$—$h$—$i$—$j$, we obtain, according to an essential characteristic of the invention, three center distances, successively for each size of casing, as follows: $a$—$b$—$c$; $b$—$c$—$d$; $c$—$d$—$e$; $d$—$e$—$f$; $e$—$f$—$g$; $f$—$g$—$h$; $g$—$h$—$i$ and $h$—$i$—$j$.

As it may be seen, each casing presents three center distances and, of these three distances, the two smaller ones are the same as the two larger ones of the casing of the directly inferior size, whereas the two larger ones are the same as the two smaller distances of the casing directly superior in size to the casing considered.

If the machined surface 3 and the removable side-plate 8 present each five bores, the relationship between the center distances of the neighbouring casings of the series should be such that the two smaller distances are equal respectively to the two largest distances of the casing of the reducer directly inferior in size, whereas the two larger distances of the considered casing are equal, respectively to the two smallest distances of the casing of the reducer directly superior in size.

The bores with which the three characteristic elements of the casing are provided, are intended to receive bearings mounted on the shafts supporting the different gears.

The bearings are enclosed in the casing by small supplementary lids, according to usual methods. These lids are not represented in the annexed drawings.

The gears are generally of two kinds: (a) bevel gears with any kind of toothing straight, spiralized, chevron-like, hypoid, and others; a given number of bevel gears presents increasing dimensions, established for different and standardized reduction-ratios. (b) Cylindrical gears with any kind of toothing straight, helical, chevron-like, etc.; a given number of sets of cylindrical gears is standardized at the rate of one or several sets for each center distance under consideration. This standardisation concerns any number and at least five successive center distances of increasing sizes $a$—$b$—$c$—$d$—$e$—$f$—$g$ . . .

By accommodating the casing, shaped as described before, with such standardized gears and at the same time making use of the special properties of the said casing and the removable sideplate and of the possibilities created by the means of lubrication, we are enabled to produce with each model of determined size, eighteen variations of speed-reducers. It should be borne in mind that these eighteen variations are inherent to each size of speed-reducer and that consequently these eighteen variations are produced by means of the same patterns and the same principal parts.

These variations may be classified into three groups, respectively:

1°—Independent reducers comprising cylindrical gears with parallel input and output shafts.
2°—Independent reducers comprising bevel and cylindrical gears with shafts at right angles.
3°—Monobloc reducers, i. e. designed to receive flanged motors and to constitute with the latter complete units.

Variations of the first group are diagrammatically represented in the Figures 20 to 31.

Figures 20, 21, 24:
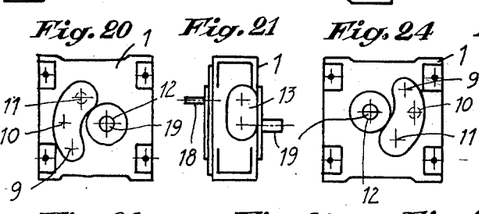

The Figures 20 and 21 represent diagrammatically a reducer with one set of gears with horizontal parallel shafts 18—19. One set of gears is mounted in the casing 1 by using the bores 11 and 12 in which are housed the bearings of the shafts the axes of which coincide, respectively with the axis of the pinion and the axis of the wheel. The bores 9 and 10 are not used and the lateral lid 13 is not bored.

This reducer may be equipped either with a single set of gears or with a double one, i. e. two pinions are mounted on the high speed shaft and two wheels on the low speed shaft. This assembly is extremely convenient when helical gears are used: the gears intended for the same shaft being cut with contrary helix angle so as to constitute a chevron-like gearing.

Figure 22:
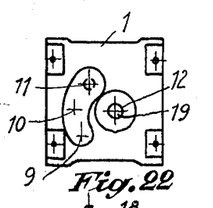
Figure 23:
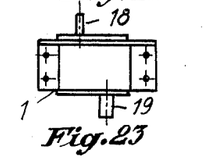

The Figures 22 and 23 represent the same embodiment as the Figures 20 and 21, but the lubrication device has been so arranged as to permit the reducer to perform with vertical shafts 18 and 19.

Figure 25:
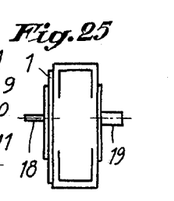

The Figures 24 and 25 represent diagrammatically another assembly of the same reducer comprising two sets of gears with parallel horizontal shafts 18, 19. In this case the two sets of gears are mounted in the casing by using the bores 10, 11 and 12, the bore 9 not being used and the lateral lid 13 not being bored.

Figure 26:
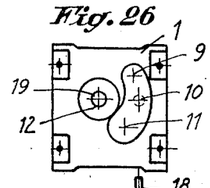
Figure 27:
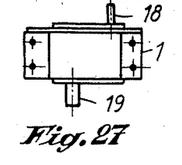

The Figures 26 and 27 represent diagrammatically the preceding assembly but in which the lubrication device is so constructed as to permit to work with vertical shafts 18, 19.

Figure 28:
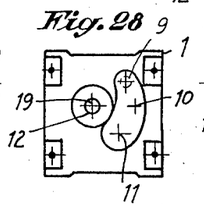
Figure 29:
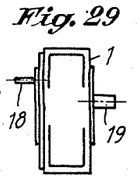

The Figures 28 and 29 represent diagrammatically a reducer with three sets of gears and parallel horizontal shafts. Three sets of gears are mounted in the casing by using the bores 9—10—11—12, the lateral lid 13 not being bored.

Figure 30:
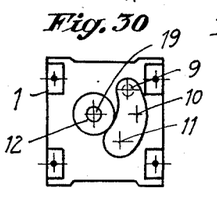
Figure 31:
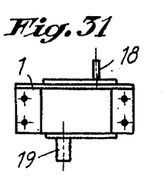

The Figures 30 and 31 represent the preceding assembly in which the lubrication device has been so arranged as to permit to work with vertical shafts 18 and 19.

Likewise have been brought together, in the second group, the assemblies of which are represented in the Figures 32 to 43, the independent reducers comprising bevel and cylindrical gears and of which the shafts are at right angles to each other.

Figures 32, 33:
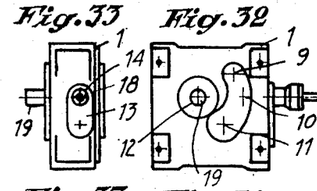

Indeed, the Figures 32 and 33 represent diagrammatically a reducer with one set of bevel gears with perpendicular horizontal shafts 18, 19. This assembly comprises one single set of bevel gears, mounted in the casing 1. The pinion is mounted on a shaft of which the bearings are accommodated in a lateral lid partly extended into the interior of the casing. The larger gear is fixed on a shaft the bearings of which are housed in the bores 12. The bores 9—10—11 are not used.

Figure 34:
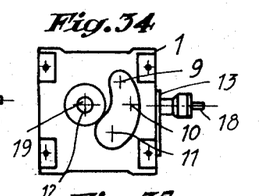
Figure 35:
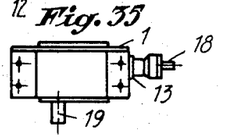

The Figures 34 and 35 represent diagrammatically an assembly similar to the preceding one but so arranged as to permit its working with the horizontal high speed shaft 18, vertical low speed shaft 19.

Figures 36, 37:
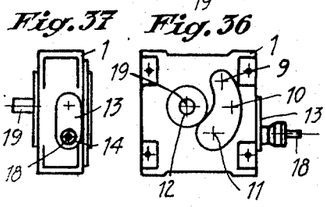

The Figures 36 and 37 represent a reducer with two sets of gears, the first of which is a bevel one and the second a cylindrical one. The shafts 18, 19 are horizontal but are at right angles to each other.

The set with bevel gears is mounted in the casing by using the bores 11 and the lateral lid 13, 14, as represented in the Figures 18 and 19, and the axis of which is at right angles to the axis of the bores 11. The cylindrical gears are mounted by using the bores 11 and 12. The bores 9 and 10 are not used.

Figures 38, 39:
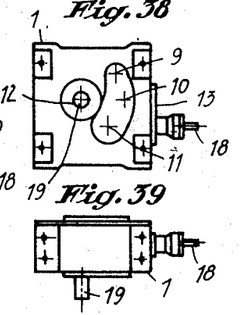

The Figures 38 and 39 represent a reducer with two sets of gears similar to the preceding, but arranged with shafts situated in perpendicular planes the input shaft being horizontal, and the low speed shaft vertical. To this purpose it is sufficient to appropriate the means of lubrication.

Figures 40, 41:
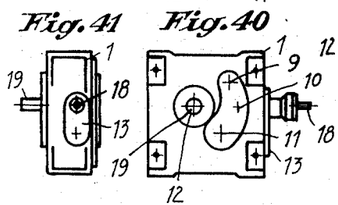

The Figures 40 and 41 represent diagrammatically a reducer with three sets of gears, the first of which is beveled the others being cylindrical and in which the shafts 18, 19 are horizontal and situated at right angles to each other.

In this assembly the set of bevel gears is mounted in the casing by using the bores 10 and the lateral lid 13—14, as represented in the Figures 18 and 19, and the axis of which is placed perpendicular to the axis of the bores 10. The cylindrical gears are mounted by using the bores 10, 11 and 12, the bores 9 not being used.

Figure 42:
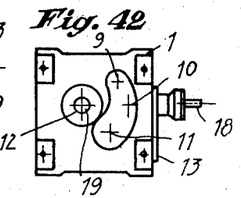
Figure 43:
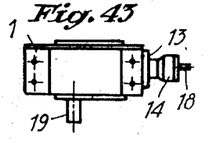

The Figures 42 and 43 represent an assembly in which the lubrication means are so arranged as to permit the speed reducer to work with horizontal high speed and vertical low speed shaft 19.

Finally, the third group comprises a series of assemblies, principally featured by its ability to form a "monobloc" unit either with a motor or with a complementary apparatus.

From these characteristics follows that, in this group, the gears, the utilisation of the bores and the ways of fixation are similar to what has been said of the assemblies of the first group, the lateral lid 13 with extended bearings 14 not being used but replaced by a non bored lid.

The motors are mounted by making use of the characteristics of the removable side-plate 8 illustrated in the Figures 8 and 9.

It is thus superfluous to repeat the characteristics of these assemblies, the only enumeration of the assemblies of the Figures 44 to 55 being sufficient.

Figure 44:
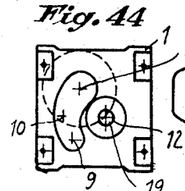
Figure 45:
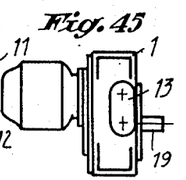
Figure 46:
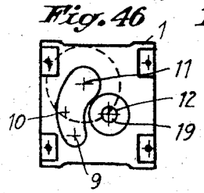
Figure 47:
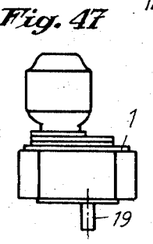
Figure 48:
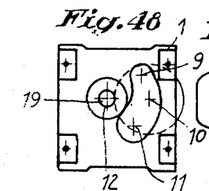
Figure 49:
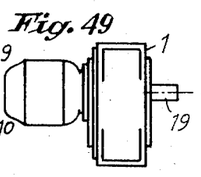
Figure 50:
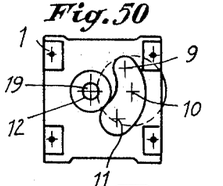
Figures 51, 53, 54, 57:
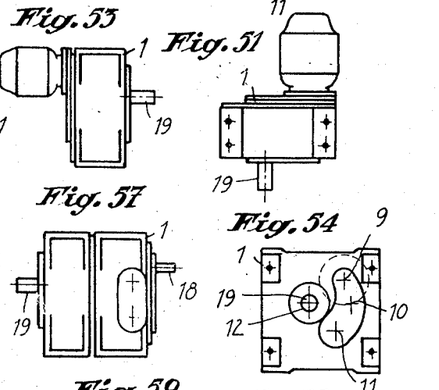
Figure 52:
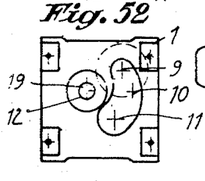
Figures 55, 59:
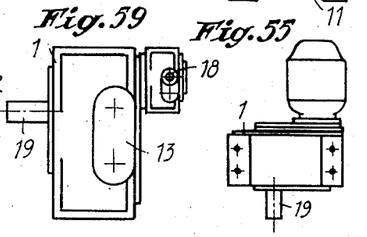

In these figures have been successively represented in Figures 44 and 45, a monobloc reducer with one set of cylindrical gears with horizontal output shaft;

In Figures 46 and 47, a monobloc reducer with one set of cylindrical gears with vertical output shaft;

In Figures 48 and 49, a monobloc reducer with two sets of cylindrical gears with horizontal output shaft;

In Figures 50 and 51, a monobloc reducer with two sets of cylindrical gears with vertical output shaft;

In Figures 52 and 53, a monobloc reducer with three sets of cylindrical gears with horizontal output shaft;

In Figures 54 and 55, a monobloc reducer with three sets of cylindrical gears with vertical output shaft.

For all these assemblies we can still consider several fixation planes, generally three, so that this fact extends the field of the possible applications of this speed-reducer.

Besides these numerous variations produced with a reduced number of parts, it must be considered that the reduction-ratio of a reducer with several sets of gears is the product of the characteristic ratios of each constituent set. The number of the total reduction-ratios is equal to the number of combinations that can be secured with the ratios of each set.

To apply this principle to the reducer of the invention, the two following points must be taken into account:

1. The gears incorporated in the different sizes of the reducer of the invention are standardized at the rate of one or several sets for each of the center distances $a$—$b$—$c$—$d$— . . .
2. These same center distances constitute the starting points from which the principal dimensions of the series of the casings with increasing sizes are established, not at the rate of one casing model per center distance, but in admitting as factor determining each size, three different successive distances, so that a same considered center distance is, in principle, used in three different sizes of casings.

It follows from the preceding that a list of standard reduction-ratios, characteristic for each size, may be calculated, by using—in the calculation of the combinations—either twice (for the assemblies with two sets) or three times (for the assemblies with three sets) one same reduction-ratio admitted as standard for a determined center distance.

It is thus possible to constitute—with a limited number of standard gear-sets—a series of standard total ratios, twice or three times more important that in a series of sizes in which the fundamental law of the choice of the center distances proper to the reducer of the invention, would not be applied.

Moreover, the general dimensions of each casing size are established so as to accommodate one same standard set of bevel gears in two successive sizes. Hence a second multiplying factor of the number of combinations that comes into consideration for the assemblies with two or three sets one of which being a bevel gearing.

In making use of all these possibilities and considering the reducer of the invention exclusively from the point of view of reduction-ratio—i. e. setting aside the perpendicularity or the parallelism of the shafts—the total number of reduction-ratios admissible in all the variations of the reducer of the invention is given—by a number of combinations equal to several times the number found for the usual reducer.

Finally, the conception of the removable side-plate permits to mount directly on the reducer of the invention a supplementary apparatus, such as an electric motor, a gear-casing, variable-speed drive or even another speed-reducer. This new element constitutes together with the initial reducer a complete unit, called "monobloc." Under these circumstances it is possible, by using suitable intermediate flanges, to constitute a new series of monobloc reducers by mounting two assemblies of the reducer of the invention one on the other. It is evident that a very great number of combinations is possible. The new monobloc groups may be provided with perpendicular or parallel shafts or receive on their turn flanged motors. The vertical or horizontal assemblies are likewise possible. The original use of the center distances, which led to the great number of the total standard reduction-ratios will know in this case a new extension.

Figure 56:
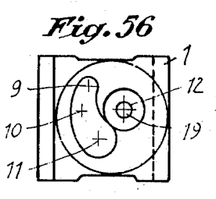
Figure 58:
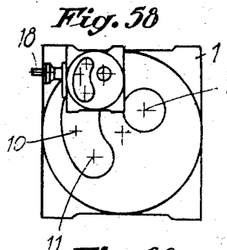
Figure 60:
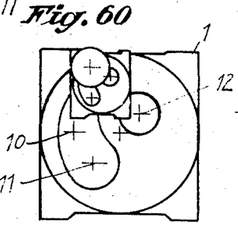
Figure 61:
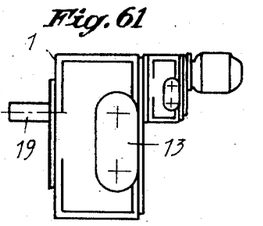

The Figures 56 to 61 give a few examples;

The Figures 56 and 57 represent diagrammatically a "combined" reducer with five sets of gears with parallel shafts; the two constituent elements are of the same size; in this case the fixation of a reducer to another is secured by the faces 3;

The Figures 58 and 59 represent diagrammatically a "combined" reducer with six sets with shafts at right angles; both elements are of different sizes;

The Figures 60 and 61 represent diagrammatically a "combined" reducer with a flanged motor.

The complete casing, i. e. provided with the removable side-plate, possesses, independently of its part in the formation of the enumerated variations, a character of universality which ought to be pointed out. It may be provided with very different parts, such as special belts, chains of all kinds, fixed and loose gears, sliding gears, claw-clutches, etc. . . . to form new units.

In spite of the great number of reduction-ratios which are standardizable with a minimum of standard sets of gears, it may happen that a special reduction-ratio is required. It should be noticed that this problem can be resolved with great facility, seeing that in the assemblies with two or three sets of gears it will suffice to secure one single gear-set with special reduction-ratio whilst the remaining standard set or sets of gears are maintained.

In all these examples we must take account of the fact that the very characteristic casing 1 presents three machined surfaces 2—3—4 by each of which the reducer may be fixed, which still considerably increases the number of possible applications.

The speed-reducer of the invention consequently appears really as a reducer of a new conception and this conception is characterized by a series of prescriptions that are simple but new on account of their being brought together in the engineering of the speed-reducers. Each reducer being capable to be presented in eighteen variations—as described before—all of the suppleness of application, primordial factor in this matter, is well assured.

It follows from these considerations that, even if we admit sufficient markets to absorb the mass production of the classical reducer, the reducer of the invention would still yield the considerable advantage of increasing, for the same number of patterns, the importance of the series in a ratio of 18 to 1, the series belonging by this fact to quite another class allowing the application of also other methods of manufacture, thus permitting to attain considerably lower cost.

The described and illustrated examples of embodiment may be modified, even thoroughly, without going beyond the limits of the invention. For example, the prismatic casing might be produced in different parts assembled and fixed to each other. Likewise, the bores might be arranged in a relatively other way than represented in the annexed drawings. The shape of the lateral lid with the extended bearing might also be modified without affecting the very conception of the speed-reducer of the invention.

It is evident that practically this speed-reducer may be produced in all models and for all usual powers.

Finally the invention also includes the combination of such an improved reducer with all other complementary apparatuses and also to coupled units of several such improved speed-reducers to obtain particularly high speed-ratios.

Evidently the speed-reducer of the invention must be completed with all the necessary accessories, which, after all, are commonly used in the current engineering of speed reducers.

What I claim is:

1. A speed reducer comprising a casing for gearing, a removable side plate and a lateral lid connected to said casing, said casing having opposite said side plate a large surface, said side plate and said surface having a series of bores for journalling gear shafts, each bore of said surface being of equal size with, disposed opposite, and in registry with, a bore in said side plate and forming therewith a pair, the number of pairs of bores being equal to the largest number of sets of gears operable in said casing plus one, the center distances between successive bores within said series progressively increasing so that the two smaller center distances are equal to two larger center distances of a casing of a reducer with next smaller dimensions, and the two larger center distances are equal to two smaller center distances of a casing of a reducer with next larger dimensions, proportional in accordance with the progression of the said increase.

2. A speed reducer as claimed in claim 1, further characterized in that the centers of the bores of each series being arranged substantially along the periphery of a circle, whereby the casing has an approximately prismatic shape with a substantially square base.

3. A speed reducer as claimed in claim 1, further characterized in that, the centers of the bores of each series being arranged along a substantially straight line whereby said casing has an approximately prismatic exterior shape and a rectangular base.

4. A speed reducer as claimed in claim 1, further characterized in that, said casing includes a side wall parallel to the axis of said bores and having at least one opening, and said lid being adapted to close said opening.

5. A speed reducer as claimed in claim 1, further characterized in that, said side plate has exterior surfaces machined in the same plane, said lid being operable to close said bores of said plate and to support accessory apparatus for said gearing.

6. A speed reducer comprising a casing for gearing open at one side and having means for lubrication, a side plate removably mounted at said open side to said casing, said casing having at least three machined exterior surfaces and having mountings for horizontal and vertical shafting and a large surface opposite said removable cover, said cover and said large surface having oppositely disposed paired bores for journalling gear shafts therebetween, the bores of said side plate and of said large surface forming opposite series, the number of bores of each series being equal to the greatest number of sets of gears operable in said casing plus one, the center distances of successive bores within each series progressively increasing so that the two smaller center distances being equal to two larger center distances of a casing of a reducer with next smaller dimensions, and the two larger center distances being equal to two smaller distances of a casing of a reducer with next larger dimensions, proportional in accordance with the progression of the said increase.

7. In a speed reducer of a series of coordinated speed reducers, said series having a predetermined rate of progression in size and ratio, in combination, a casing for gearing open at one side, and a side plate removably connected at said open side to said casing, said casing having opposite said side plate a surface, said side plate and said surface having oppositely disposed bores for journalling gear shafts, the bores of each said side plate and said surface being grouped and the center distances between the bores of each group increasing in accordance with said rate of progression.

DAVID HANSEN.

REFERENCES CITED

The following references are of record in the file of this patent:

UNITED STATES PATENTS

| Number | Name | Date |
| --- | --- | --- |
| 1,164,419 | Smith et al. | Dec. 14, 1915 |
| 1,327,681 | Leipert | Jan. 13, 1920 |
| 1,377,879 | Garelli | May 10, 1921 |
| 1,778,432 | Ramsey | Oct. 14, 1930 |
| 2,156,739 | Schmitter | May 2, 1939 |
| 2,220,542 | Peterson | Nov. 5, 1940 |
| 2,313,548 | Hoge | Mar. 9, 1943 |
| 2,549,652 | Wilhelm | Apr. 17, 1951 |